US012576434B2

(12) United States Patent
Kwon et al.

(10) Patent No.: US 12,576,434 B2
(45) Date of Patent: Mar. 17, 2026

(54) LIVESTOCK CARCASS TREATMENT SYSTEM USING ULTRA-HIGH TEMPERATURE MICROORGANISMS

(71) Applicant: SHINHWA CONSTRUCTION CO., LTD, Gangneung-si (KR)

(72) Inventors: Young-Jun Kwon, Donghae-si (KR); Jun-Hyung Kwon, Gangneung-si (KR); Masaichi Yamamura, Kagoshima (JP)

(73) Assignee: SHINHWA CONSTRUCTION CO., LTD, Gangneung-si (KR)

( * ) Notice: Subject to any disclaimer, the term of this patent is extended or adjusted under 35 U.S.C. 154(b) by 995 days.

(21) Appl. No.: 17/769,622

(22) PCT Filed: Oct. 17, 2019

(86) PCT No.: PCT/KR2019/013651
§ 371 (c)(1),
(2) Date: Apr. 15, 2022

(87) PCT Pub. No.: WO2021/075599
PCT Pub. Date: Apr. 22, 2021

(65) Prior Publication Data
US 2023/0136156 A1 May 4, 2023

(51) Int. Cl.
*B09B 3/60* (2022.01)
*C05F 1/00* (2006.01)
(Continued)

(52) U.S. Cl.
CPC ................ *B09B 3/60* (2022.01); *C05F 1/005* (2013.01); *C05F 1/02* (2013.01); *C05F 17/20* (2020.01); *C05F 17/964* (2020.01); *C05F 17/993* (2020.01)

(58) Field of Classification Search
None
See application file for complete search history.

(56) References Cited

U.S. PATENT DOCUMENTS 7,371,556 B2 * 5/2008 Oshima .................... C12N 1/20
435/267

FOREIGN PATENT DOCUMENTS

CN 105418183 A * 3/2016
JP 2000-354897 12/2000
(Continued)

OTHER PUBLICATIONS

Written Opinion for International Application No. PCT/KR2019/013651, dated Jul. 14, 2020.
(Continued)

*Primary Examiner* — William H. Beisner
(74) *Attorney, Agent, or Firm* — KILE PARK REED & HOUTTEMAN PLLC

(57) ABSTRACT

The present invention relates to a carcass treatment system 1. Such a carcass treatment system 1 ferments and decomposes carcasses by hyperthermophile of 85 to 110° C. and aerobic conditions, and comprises a mobile fermentation process unit 3 for transferring to an onset site of disease and treating the livestock carcass by hyperthermophile; or a burial fermentation process unit 5 for excavating a burial site 6 near the outbreak site of disease and treating the livestock carcass by hyperthermophile; a base treatment unit 7 for secondarily processing the livestock carcass treated primarily by the mobile fermentation process unit 3 or the burial fermentation process unit 5 with hyperthermophile, wherein the primary treatment is performed by treating with hyperthermophile at fermentation temperature of 85 to 110° C. for 8-15 days to decompose flesh of the carcass, and the secondary treatment is performed by treating with hyperthermophile for 2-4 weeks.

12 Claims, 13 Drawing Sheets

(51) Int. Cl.

| | | |
|---|---|---|
| *C05F 1/02* | (2006.01) | |
| *C05F 17/20* | (2020.01) | |
| *C05F 17/964* | (2020.01) | |
| *C05F 17/993* | (2020.01) | |

(56) References Cited

FOREIGN PATENT DOCUMENTS

| | | | | |
|---|---|---|---|---|
| JP | 2004033899 | A | * | 2/2004 |
| KR | 10-0702258 | | | 4/2007 |
| KR | 20-0470568 | | | 12/2013 |
| KR | 101450752 | B1 | * | 10/2014 |
| KR | 101491019 | B1 | * | 2/2015 |
| KR | 10-1737414 | | | 5/2017 |
| KR | 10-1787683 | | | 10/2017 |
| KR | 10-2036091 | | | 10/2019 |

OTHER PUBLICATIONS

International Search Report, with English translation, for International Application No. PCT/KR2019/013651, dated Jul. 14, 2020.

* cited by examiner

FIG. 3

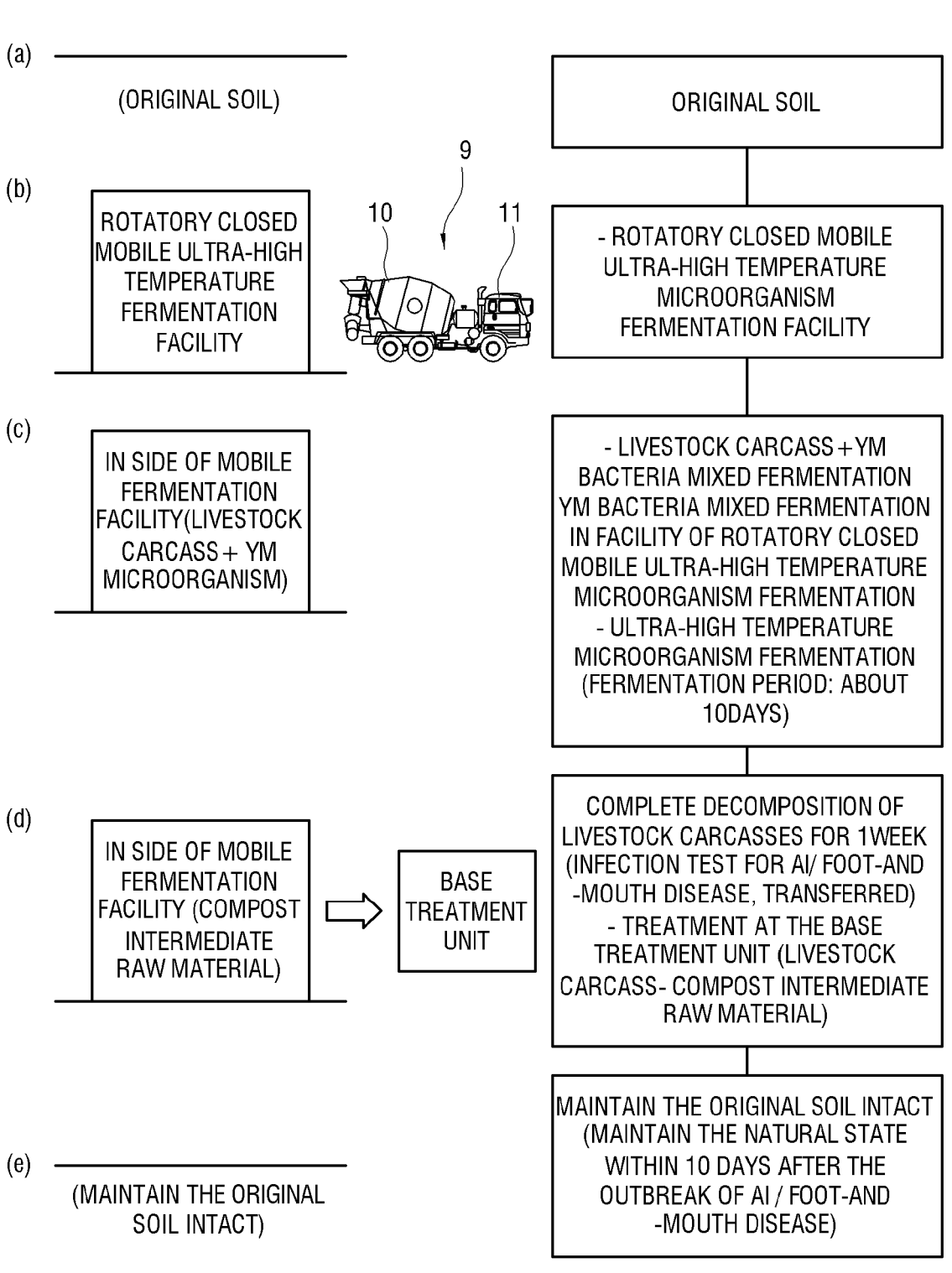

(a) ─────────────── (ORIGINAL SOIL)

ORIGINAL SOIL (b) ROTATORY CLOSED MOBILE ULTRA-HIGH TEMPERATURE FERMENTATION FACILITY 9
10   11

- ROTATORY CLOSED MOBILE ULTRA-HIGH TEMPERATURE MICROORGANISM FERMENTATION FACILITY (c) IN SIDE OF MOBILE FERMENTATION FACILITY(LIVESTOCK CARCASS + YM MICROORGANISM)

- LIVESTOCK CARCASS + YM BACTERIA MIXED FERMENTATION YM BACTERIA MIXED FERMENTATION IN FACILITY OF ROTATORY CLOSED MOBILE ULTRA-HIGH TEMPERATURE MICROORGANISM FERMENTATION
- ULTRA-HIGH TEMPERATURE MICROORGANISM FERMENTATION (FERMENTATION PERIOD: ABOUT 10DAYS)

(d) IN SIDE OF MOBILE FERMENTATION FACILITY (COMPOST INTERMEDIATE RAW MATERIAL)

BASE TREATMENT UNIT

COMPLETE DECOMPOSITION OF LIVESTOCK CARCASSES FOR 1WEEK (INFECTION TEST FOR AI/ FOOT-AND-MOUTH DISEASE, TRANSFERRED)
- TREATMENT AT THE BASE TREATMENT UNIT (LIVESTOCK CARCASS- COMPOST INTERMEDIATE RAW MATERIAL)

(e) ─────────────── (MAINTAIN THE ORIGINAL SOIL INTACT)

MAINTAIN THE ORIGINAL SOIL INTACT (MAINTAIN THE NATURAL STATE WITHIN 10 DAYS AFTER THE OUTBREAK OF AI / FOOT-AND-MOUTH DISEASE)

10

15

LIVESTOCK CARCASS TREATMENT SYSTEM USING ULTRA-HIGH TEMPERATURE MICROORGANISMS

CROSS-REFERENCE TO RELATED APPLICATION(S)

This application is a national entry of International Application No. PCT/KR2019/013651, filed on Oct. 17, 2019, the entire contents of which are incorporated herein by reference.

TECHNICAL FIELD

The present invention relates to a livestock carcass treatment system using hyperthermophile, and more particularly, to technology that firstly, can rapidly process a carcass at the site of an outbreak and quickly restore the site to its original state and secondly, increase the processing efficiency of the carcass by fermenting it at the base treatment unit, by selectively applying a rotatory closed mobile fermentation process unit or an ultra-high temperature aerobic burial fermentation process unit during fermenting carcasses by hyperthermophile (YM bacteria).

BACKGROUND ART

Considering at the current status of the livestock industry and the damage caused by infectious diseases, the number of breeding herds is steadily increasing every year due to the intensive and large-scale livestock industry according to the rapid growth.

In 2016, in the case of highly pathogenic AI infection, 22,150 thousand heads were killed and the amount of damage amounted to 261.2 billion won, and in the case of foot-and-mouth disease infection, 3,480 thousand heads were killed, and the damage amounted to 2738.3 billion won in 2010/2011.

In addition, the problem of disposal of the culled livestock and the effect of these culled livestock on the environment are of interest not only in Korea but also worldwide.

Looking at the problems with the current culling method, in the case of Korea, incineration and burial are implemented according to the Livestock Infectious Disease Prevention Act, and the burial of culled livestock causes contamination of surrounding soil, groundwater, and rivers, such as leakage of leachate and odor in some poorly burial sites.

In addition, the leachate flowing out from the decay process after burial may contain microorganisms and viruses harmful to the human body, and contamination of groundwater and surrounding rivers causes enormous social costs for reprocessing costs and odors.

Furthermore, the highly pathogenic AI has repeated outbreaks every two years since 2000, and the scale of damage is expanding. Avian influenza is an infectious disease caused by virus infection, and it is classified into low pathogenic AI and high pathogenic AI, and as of 2016, 22, 150 thousand heads were killed and the damage amounted to 261.2 billion won.

In addition, foot-and-mouth disease caused 3,480 thousand heads of culling and the amount of damage amounted to 2,738.3 billion won in 2010/2011. Since then, the outbreak has continued while vaccines have been prescribed, but the amount of damage is somewhat decreasing.

And, most carcasses are buried for the purpose of treating infected livestock and preventive culling and some are incinerated. Between 2013 and 2016, regardless of whether or not a vaccine was prescribed, AI and foot-and-mouth disease in Korea are the second in AI and the first in the proportion of global culling caused by AI and foot-and-mouth disease.

During this period, the proportion of culling due to AI outbreaks was in the order of 35.3% in the United States, 34.4% in Korea, and 19.4% in Mexico, and the proportion of culling according to the outbreak of foot-and-mouth disease was in the order of 41.9% in Korea, 14.4% in Zambia, and 7.8% in Russia (Table 1). Therefore, the continuous increase in the amount of damage caused by the high culling rate and the burden of the cost of disposing of the carcass are increasing.

TABLE 1

| nation | Number of culling | Worldwide rate | nation | Number of culling | Worldwide rate |
|--------|-------------------|----------------|--------|-------------------|----------------|
| USA | 49,241,700 | 35.3% | Korea | 208,000 | 41.9% |
| Korea | 47,922,000 | 34.4% | Zambia | 71,500 | 14.4% |
| Mexico | 27,065,817 | 19.4% | Russia | 38,705 | 7.8% |
| China | 5,997,442 | 4.3% | Botswana | 31,280 | 6.3% |
| Taiwan | 5,606,198 | 4.0% | Republic of South Africa | 28,075 | 5.7% |

In general, livestock carcass treatment methods include burial, anaerobic digestion, rendering, composting, incineration, alkaline hydrolysis, lactic acid fermentation, etc.

In such a livestock carcass treatment method, most of them are treated in a burial method due to on-site conditions, and other treatment methods such as incineration are not used.

In the case of carcass treatment using the burial method, side effects such as leachate and odor generation due to decay may occur in the livestock carcass even if it is proceeded normally. In addition, due to these side effects, the surrounding soil and groundwater may be contaminated, and additional agricultural water contamination may occur.

Also, contamination to the surrounding environment can cause the outbreak of other secondary infectious diseases and there is a risk of secondary infection due to the virus remaining in the carcass.

In addition, the leachate leaked from the burial site has many problems with livestock blood and liquid contaminants from the livestock decomposition process, so there is an attempt to try a vaccination method rather than a standardized burial treatment method. Attempts to diversify processing methods to non-burial methods such as rendering, incineration, and FRP tank storage are being made, but with little effect.

In the rendering method, after heat sterilization of livestock carcasses at a high temperature (150~250° C. and a pressure of 3~4 kg/cm$^2$, among the remaining by-products, protein is used as compost, and fat is used to manufacture oil, biodiesel and the like.

However, when rendering livestock carcasses in burial sites where soil is mixed and decay has progressed, it is practically difficult to utilize by-products.

In addition, since the by-product remaining after treatment cannot be completely converted into a liquid material, it cannot be treated in an environmental basic facility, and in the end, there is no choice but to be landfilled again, so it is not a fundamental solution, and secondary environmental pollution may occur due to landfill by-products.

In addition, there are very few places where rendering can be done in Korea, with a total of 4 places and since foot-and-mouth disease and AI outbreaks axis (suspicious axis) have been treated on-site with minimal movement in principle, it is practically impossible to render contaminated livestock by moving it over a long distance.

Also, various treatment methods are being studied, focusing on the incineration method and the rendering method, and the incineration method generates less residue after incineration (2~3%), but the cost of purchasing equipment is high, and maintenance and management such as movement and storage are difficult, so livestock carcasses cannot be processed efficiently.

In addition, a thermochemical liquefaction treatment method has been developed that decomposes the carcasses by hydrolyzing them using an acid or alkaline agent after heat treatment of the carcasses, and the use of liquefied by-products as liquid fertilizers and powder fertilizers is being studied, but practicality is still low.

In addition, the number of livestock that have been culled and buried since 2000 due to foot-and-mouth disease and AI is 3.91 million of cows, pigs, and 77.3 million of poultry. All livestock within a 3 km radius of the outbreak farm are culled, and over the past two years (2016-2017), 38.05 million animals were culled, and among these culled livestock, 31.55 million waters were buried (83%) and 6.5 million waters were recycled (17%), and most of them depend on burial.

When AI foot-and-mouth disease occurs, burial and storage of livestock carcasses in FRP barrels has been introduced since 2014, and buried livestock carcasses do not decay and remain mummified for three years, so reprocessing is inevitable, and the government budget is doubly wasted.

However, domestic research on carcass disposal is mostly focused on safe carcass disposal in consideration of the prevention of spread of infectious diseases, post-treatment and management of burial sites, animal welfare and environmental pollution, etc. and to date, the recycling of carcasses that have been culled due to livestock infectious diseases has not been studied.

According to the Standard Operating Procedure (SOP), it is described that 'livestock buried in a storage tank turns into liquid in 6 months', but according to a media report in January 2017, it has been confirmed that the avian influenza carcass buried in Hapcheon-gun, Gyeongsangnam-do in March 2014 remains intact without decay. In this case, it costs more than 5 times because reprocessing must be performed by aerobic thermophilic method.

In addition, although epidemiological investigations are conducted to identify the cause and spread of livestock infectious diseases, there is a limit to find the exact cause of the disease because the propagation routes are diverse.

Therefore, the importance of preventive measures is being emphasized, in the event of an unnecessary and urgent, the event of an outbreak of a livestock infectious disease, post-mortem measures should be prepared to effectively deal with it, but there are many problems in the handling of carcasses to date.

DISCLOSURE

Technical Problem

Therefore, the present invention has been proposed to solve this problem, and an object of the present invention is to provide a technology that firstly, can rapidly process a carcass at the site of an outbreak and quickly restore the site to its original state and secondly, increase the processing efficiency of the carcass by fermenting it at the base treatment unit, by selectively applying a rotary closed mobile fermentation process unit or an ultra-high temperature aerobic burial fermentation process unit during fermenting carcasses by hyperthermophile (YM bacteria).

In addition, it is an object of the present invention to provide a livestock carcass treatment technology, which is excellent in killing pathogens due to its ultra-high fermentation temperature (85~110° C.), so it can not only decompose animals or livestock carcasses infected with highly pathogenic AI and foot-and-mouth disease virus in a short time, but also are eco-friendly and sustainable that can be recycled 100% by processing the final fermented material in the subsequent fermentation process.

Technical Solution

In order to achieve the above technical problem, an embodiment of the present invention provides a livestock carcass treatment system 1 for fermenting and decomposing livestock carcass by hyperthermophile under aerobic conditions, comprising:

a mobile fermentation process unit 3 for transferring to an onset site of disease and treating the livestock carcass by hyperthermophile; or a burial fermentation process unit 5 for excavating a burial site 6 near the outbreak site of disease and treating the livestock carcass by hyperthermophile; and a base treatment unit 7 for secondarily processing the livestock carcass treated primarily by the mobile fermentation process unit 3 or the burial fermentation process unit 5 with hyperthermophile, wherein the primary treatment is performed by treating with hyperthermophile at fermentation temperature of 85 to 110° C. for 8-15 days to decompose flesh of the carcass, and the secondary treatment is performed by treating with hyperthermophile for 2-4 weeks to decompose bones.

Advantageous Effects

As described above, the livestock carcass treatment system according to an embodiment of the present invention has the following advantages.

First, in the processing of carcasses, it firstly, can rapidly process carcasses at the site of an outbreak and quickly restore the site to its original state and secondly, increase the processing efficiency of the carcass by fermenting it at the base treatment unit, by selectively applying a rotary closed mobile fermentation process unit or an ultra-high temperature aerobic burial fermentation process unit during fermenting carcasses by hyperthermophile (YM bacteria) without the need for a separate heat source.

Second, the first temperature sensor is mounted on the rotary closed fermenter of the mobile fermentation process unit, the second temperature sensor is mounted on the burial site of the burial fermentation process unit, and the third temperature sensor is mounted on the fermentation tank of the base process unit, and the temperature values received from each temperature sensor are recognized by a controller to determine whether to proceed with each process and thus the livestock carcass treatment process can be performed more easily.

Third, various problems such as leachate and residual virus leakage and environmental pollution caused by existing carcass treatment methods (burial, incineration, rendering, etc.) have been significantly improved and it has the advantage of being eco-friendly and sustainable because it can decompose animals or carcasses infected with highly pathogenic AI and foot-and-mouth disease virus in a short time, as well as 100% recycling of the final fermented product to the carcass treatment of the subsequent fermentation process.

Fourth, it has been found that foot-and-mouth disease virus is killed at 56° C. for 30 minutes or more and AI virus is killed at 70° C. for 30 minutes or more. Therefore, since the fermentation temperature of this ultra-high temperature aerobic fermentation method is 85~110° C., there is an advantage that foot-and-mouth disease virus and highly pathogenic AI virus can be immediately killed from the start of fermentation.

Fifth, aerobic hyperthermophile not only dramatically decompose difficult-to-decompose organic substances that general aerobic microorganisms cannot decompose, but also have an excellent effect on killing pathogens due to ultra-high temperature. In particular, it is excellent in removing odors, and it is a permanent resource circulation system that reduces waste by more than 85% and recycles 100% of the final product, and has the advantage of completely decomposing livestock carcasses within 10 days and having no secondary by-products.

Sixth, in the fermentation decomposition process, heat-resistant enzymes such as protease, collagenase, and lipase produced by aerobic hyperthermophile rapidly decompose difficult-to-decompose proteins and lipids such as keratin of livestock carcass, and the decomposed organic matter is used for energy of microorganisms, and in the process, heat is rapidly generated, and the decomposition temperature is 85° C. or higher.

This ultra-high temperature environment further increases the activity of decomposing enzymes, so the decomposition of organic matter is accelerated and the decomposition rate is accelerated, and finally, animal carcass body components are released as harmless and treatable gases such as carbon dioxide, water vapor, and ammonia.

DESCRIPTION OF DRAWINGS

FIG. 3 shows the rotatory closed mobile carcass treatment process of FIG. 1.

BEST MODE

Figure 1:
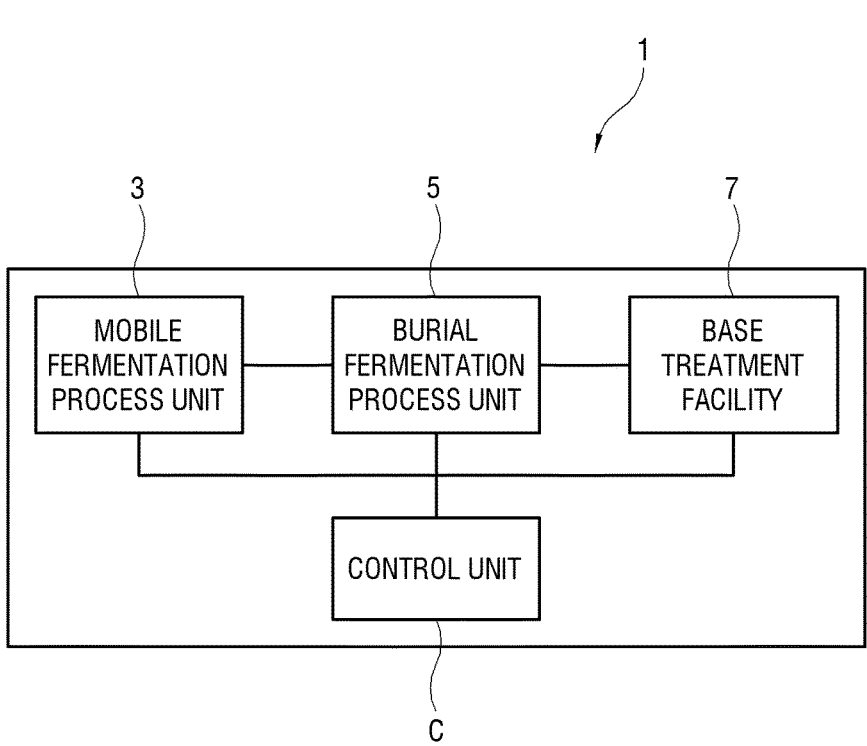
FIG. 1 shows a block diagram showing the overall configuration of a carcass treatment system according to an example of the present invention.
Figure 2:
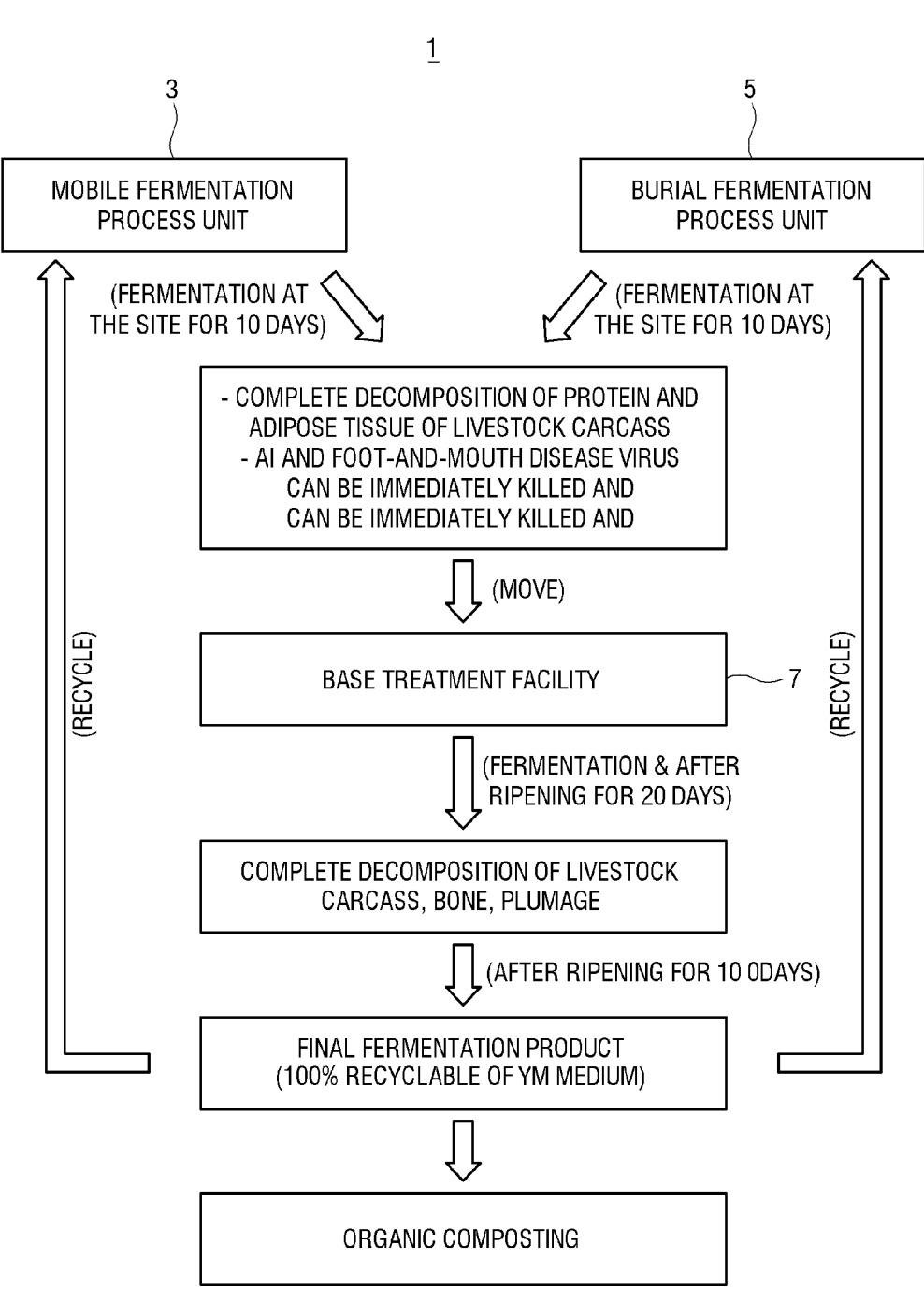
FIG. 2 shows configuration of the livestock carcass treatment system shown in FIG. 1 in more detail.

Hereinafter, a livestock carcass treatment system by hyperthermophile according to an example of the present invention will be described in detail with reference to the accompanying drawings.

As shown in FIG. 1 to FIG. 15, the livestock carcass treatment system 1 proposed by the present invention comprises a mobile fermentation process unit 3 for moving to an outbreak site of disease and to process the livestock carcass by hyperthermophile; a burial fermentation process unit 5 for excavating a burial site 6 in an area adjacent to the outbreak site and primarily processing the livestock carcass by hyperthermophile; a base treatment facility 7 for secondarily treating the livestock carcass that have been primarily treated with hyperthermophile.

When describing this livestock carcass treatment system 1 in more detail, the mobile fermentation process unit 3 may ferment the livestock carcass by directly moving the rotary closed fermentation device 9 to the outbreak site of disease. In this case, not only the carcass of livestock, but also animal carcasses other than livestock are included.

Figure 4A:
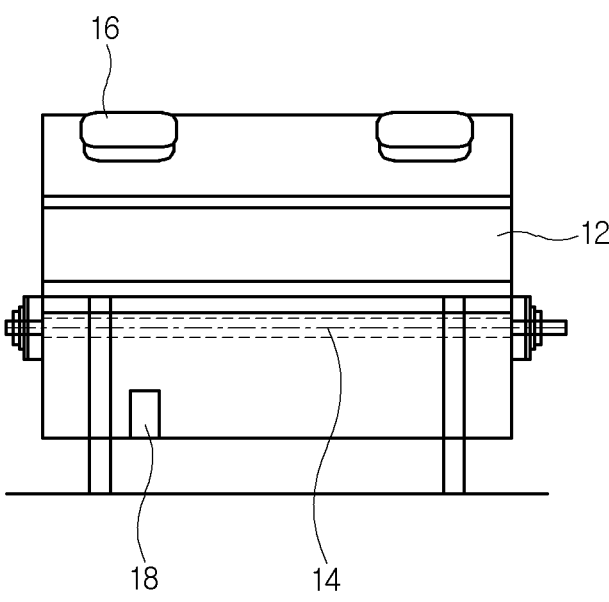
FIG. 4A is a front view of the rotary closed mobile fermentation apparatus shown in FIG. 3.
Figure 4B:
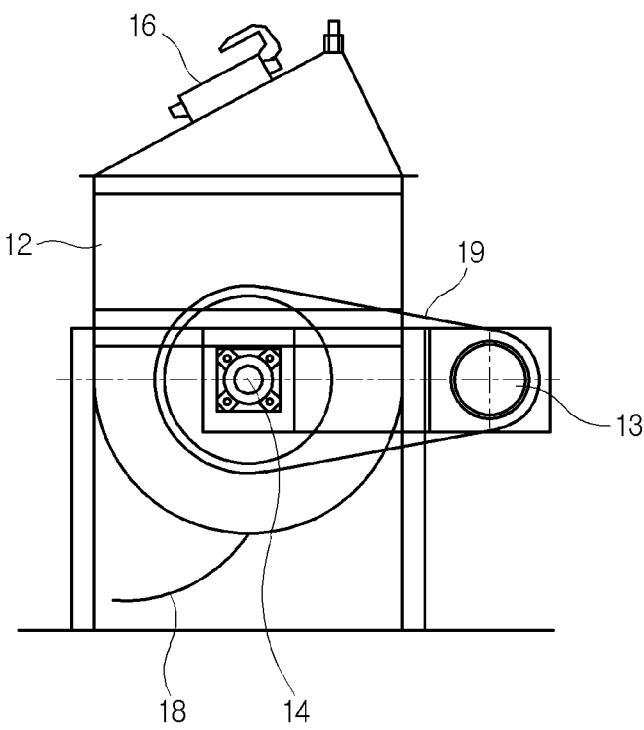
FIG. 4B is a side view.
Figure 4C:
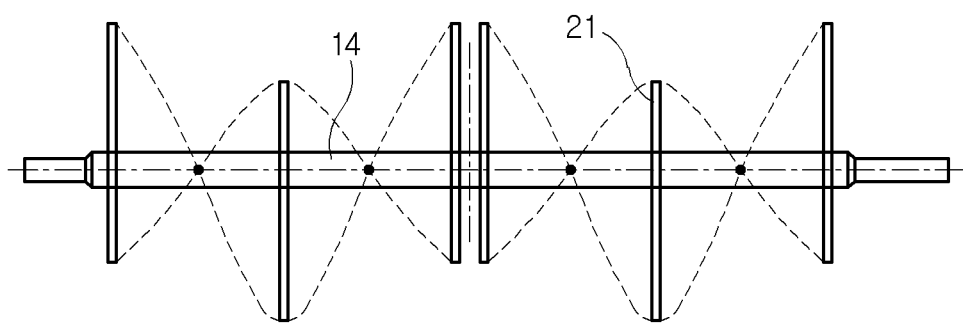
FIG. 4C is a plan view.

As shown in FIG. 3 to FIG. 4C, the rotary closed fermentation device 9 is mounted on a truck or the like and can be easily moved to the outbreak site of disease.

That is, the rotary closed fermentation apparatus 9 comprises a movable transfer means 11; and a rotary closed fermenter 10 which is mounted on the transfer means 11 and rapidly and completely decomposes the livestock carcass by hyperthermophile.

As the transfer means 11, various means such as trucks are applicable, and all of which are mobile by mounting the rotary closed fermenter 10 are possible.

The rotary closed fermenter 10 ferments in the process of mixing the livestock carcass and the hyperthermophile in the horizontal direction by the stirring blades 21.

More specifically, the rotary closed fermenter 10 comprises a body 12 having a space formed therein; a motor assembly 13 provided on one side of main body 12 having a space therein for generating a rotational force; a stirring means 15 horizontally disposed inside the main body 12 for mixing the livestock carcass and the hyperthermophile during rotation; an inlet 16 provided on one side of the main body 12 for introducing the livestock carcass and hyperthermophile therein; and an outlet 18 provided on the other side of the main body 12 for discharging fermented livestock carcass in the form of fermented products.

The fermentation process is carried out while mixing the carcass of livestock and the hyperthermophile medium introduced through the inlet 16 in the horizontal direction by the stirring means 15. Various means are applicable to this stirring means 15, for example, a ribbon blade is applied in the present invention.

That is, the stirring means 15 includes a central shaft 14 connected to the rotation shaft of a motor assembly 13 to rotate; stirring blades 21 arranged in a spiral on the outer circumferential surface of the central shaft 14 to mix the livestock carcass and the hyperthermophile arrangement in the axial direction when the central shaft 14 rotates; and a blower (not shown) for supplying hot air.

The central shaft 14 is disposed in the horizontal direction on the inside of the main body 12 and is rotatable as both ends are supported by the main body 12 by bearings or the like. Also, one end of the central shaft 14 is connected to the rotation shaft of the motor assembly 13 by a chain 19 or a belt. Accordingly, when the motor assembly 13 is driven, the rotational force is transmitted to the central shaft 14 so as to be rotatable.

At this time, on the circumferential surface of the central shaft 14, the stirring blades 21 are arranged in a spiral shape. Therefore, when the central shaft 14 rotates, the stirring blade 21 also rotates, so that it is possible to transfer the livestock carcass and the hyperthermophile batch to the outlet 18 in a mixed state.

In addition, during the mixing process, air is sprayed from the bottom from the blower, thereby further accelerating the fermentation process of the hyperthermophile medium.

When operating such a rotary closed mobile fermenter 10, the temperature inside the main body 12 is maintained in a temperature range of about 85 to 110° C., preferably maintained at a constant temperature at 90 to 95° C.

And, at the time of stirring, after stirring for 1 hour, the decomposition of livestock is carried out for about 8-15 days at a temperature of 90 to 95° C. in a stationary state, preferably for about 10 days. As a result of the experiment, after about 10 days, complete decomposition of protein and adipose tissue except for bone is achieved.

In this way, after the livestock carcass is primarily decomposed by the rotary closed mobile fermenter 10, the transfer means 11 is transferred to the base treatment unit 7 and the secondary fermentation process is performed until the bones are completely decomposed.

At this time, the fermentation treatment period in the base treatment unit 7 is appropriate for about 2-4 weeks, preferably for 3 weeks. If necessary, the final decomposition product can be recycled again and 100% recycled as an ultra-high temperature fermentation medium.

By applying the mobile fermentation process unit 3 in this way, AI and foot-and-mouth disease virus can be immediately killed and fermented directly at the site where AI or foot-and-mouth disease occurred without the need to move livestock carcasses away therefrom.

In addition, by using the hyperthermophile according to the present invention, it is possible to completely decompose tissues such as proteins except bones in a short period of about 8 to 15 days by the primary fermentation process in the field, and the bones can be completely decomposed for about 2-4 weeks through the secondary fermentation process after being transferred to the base processing unit 7.

On the other hand, the hyperthermophile can decompose the livestock carcass efficiently in a short period of time by having the following physical properties.

The ultra-high temperature microorganisms used in the present invention is named hyperthermophile in English, and is also called Extreme Thermophile or Archaea in Korean.

The hyperthermophile of the present invention is an aerobic thermophilic group which is active and moves under ultra-high temperature aerobic conditions of 85 to 110° C. and hygienically and rapidly decomposes all organic wastes such as food waste, sewage sludge, livestock manure, and alcohol sludge. Since the body composition of livestock carcass is mostly composed of organic matter of proteins and fats and water, it can be fermented and decomposed by aerobic hyperthermophile treatment.

Through the fermentative decomposition process, recalcitrant proteins and lipids, which are recalcitrant organic substances and cannot be decomposed by general aerobic microorganisms such as keratin from carcass, are rapidly decomposed by heat-resistant enzymes such as protease, collagenase, and lipase produced by hyperthermophile. The decomposed organic substances are used for the energy of microorganisms, and in the process, heat is rapidly generated, and the decomposition temperature is 85° C. or higher.

This ultra-high temperature environment further increases the activity of decomposing enzymes, so the decomposition of organic matter is promoted and the decomposition rate is accelerated and finally, animal carcass body components are released as harmless and treatable gases such as carbon dioxide, water vapor, and ammonia.

The growth temperature of the hyperthermophile (YM bacteria) applied to the present invention is around 100° C., which is a big difference from the growth temperature of around 55° C. of general aerobic fermentation bacteria. Due to such high growth temperature, the decomposition effect of carcass treatment is excellent, the reduction rate is excellent, and the effect of killing pathogenic bacteria and viruses is excellent.

In particular, it is excellent in removing odors, and it is a permanent resource circulation system in which waste can be reduced by more than 85%, and at the same time, the final product is 100% recycled, and it is a carcass treatment method that completely decomposes livestock carcasses within 10 days and has no secondary by-products.

As described above, the hyperthermophile of the present invention is generally defined as having an optimal growth temperature of 85 to 110° C., and because it inhabits at or above the boiling point of water and grows well even under high-temperature-high-pressure-high salt conditions, it is completely distinguished from general high-temperature microorganisms with an optimum growth temperature of 50~70° C. and completely decomposes animal and poultry carcasses within 10 days.

The hyperthermophile used in the present invention is a hyperthermophile belonging to the genus Caldothrix, which does not proliferate below 50° C. and can grow at 80° C. or higher. It preferably belongs to Caldothrix *Satsumae*, and most preferably belongs to Caldothrix *Satsumae* YM081 (FERM BP-8233) strain.

Details of the Caldothrix *Satsumae* YM081 (FERM BP-8233) are described in Korean Patent No. 10-0702258.

Specifically, a bacterium named Caldothrix *Satsumae* YM081 was deposited at the Patent Biological Deposit Center of the National Institute of Industrial Technology, an independent administrative agency, and it has been assigned as an accession number FERM P-18598. And it was transferred to the International Deposit and assigned as an accession number FERM BP-8233.

In addition, an example of an epigenetic sequence based on the nucleotide sequence of the 16Sr DNA of Caldothrix *Satsumae* YM081 (FERM BP-8233) is described in Korean Patent No. 10-0702258.

The contents of the deposited biological material of the present invention are as follows.

1. Name of Depository Authority and Name of Recipient that Biomaterials are Deposited Name: Patent Biology Deposit Center of National Institute of Advanced Industrial Science and Technology (independent administrative corporation)

Address: ZIP Code 305-8565 1 Central 6, 1 East 1-chome, Tsukuba City, Ibaraki, Japan 2. Date of Deposit Heisei 14 (2002) November 7

(Original deposit date: November 13, Hei 13 (2001))

3. Accession Number

FERM BP-8233

The inventors of the present invention obtained the strain with the consent of the holder of the patent right, devised a plan to apply these hyperthermophiles to the carcass treatment of the present invention and tested it in various ways, and as a result, considerable results were achieved.

As described above, the livestock carcass treatment system using aerobic hyperthermophile according to the present invention has the advantage of solving the problems of carcass treatment in the past and effectively providing the carcass treatment system.

With the development of high-efficiency carcass treatment technology using aerobic hyperthermophile, it is possible to improve the existing problems of carcass disposal, such as environmental pollution caused by organic matter and social loss due to long-term treatment period.

There are advantages that in case of AI and foot-and-mouth disease, it is possible to design a disinfection facility for culling and to use it as a policy, and also to actively discuss with each local government to create a type of disposal facility suitable for each region.

Fermentation technique using aerobic hyperthermophile can be used not only for carcass treatment, but also for the treatment of various livestock waste and food waste, and it can be applied to the treatment of various industrial wastes and radioactive materials by conducting research on the decomposition or deactivation of heavy metals and chemicals.

On the other hand, the present invention is not limited to the mobile fermentation process unit 3, it is possible to effectively decompose livestock carcasses even with the burial fermentation process unit 5 due to the improved fermentation processing efficiency of hyperthermophile.

Figure 5:
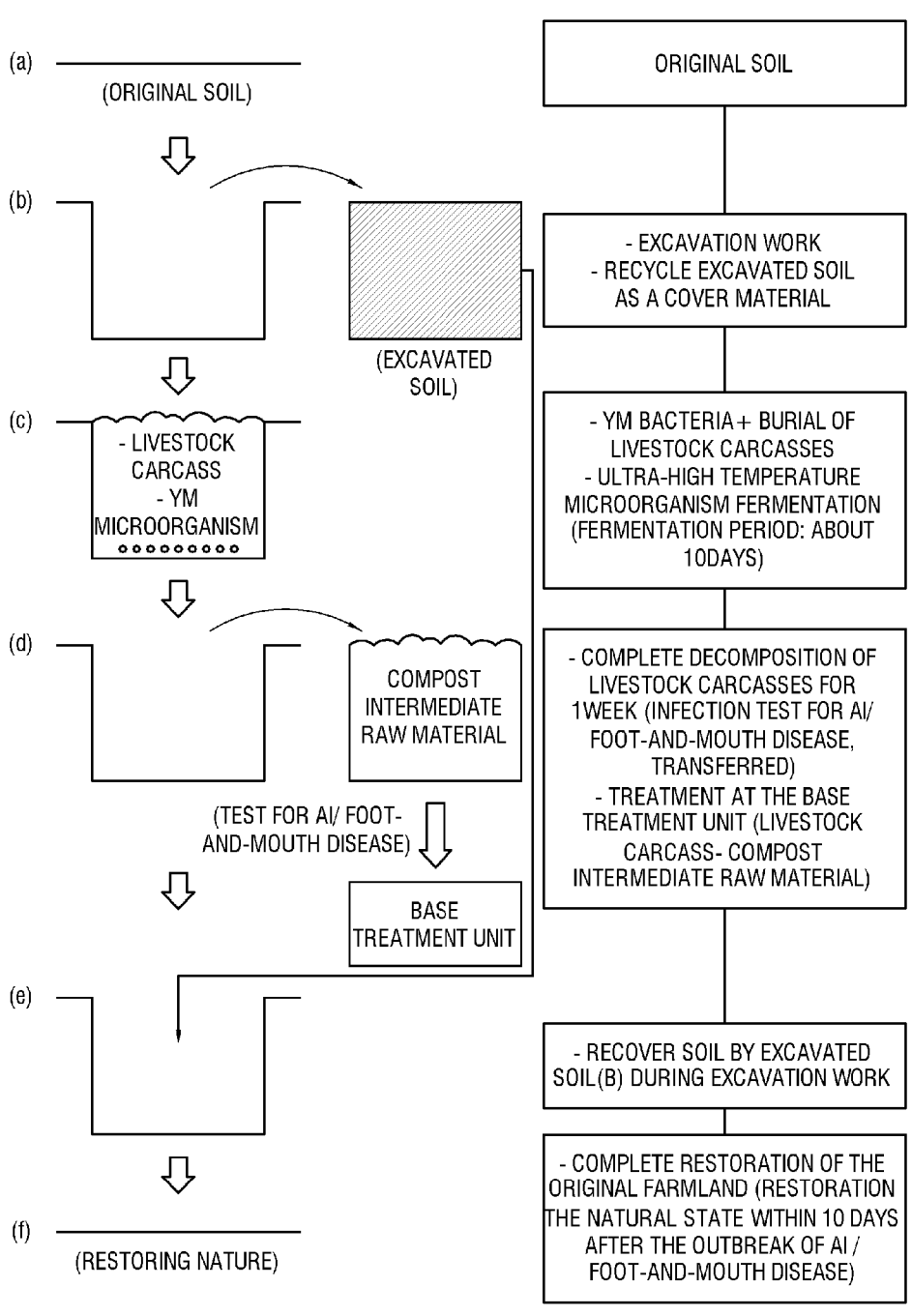
FIG. 5 is a view showing the process of burial ultra-high temperature carcass treatment shown in FIG. 3.
Figure 6A:
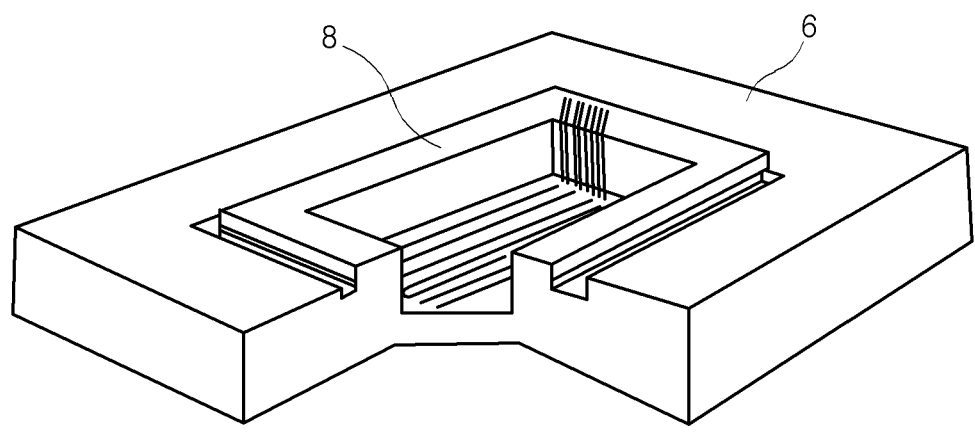
FIG. 6A is a perspective view showing a burial facility applied to the burial carcass treatment process shown in FIG. 5.
Figure 6B:
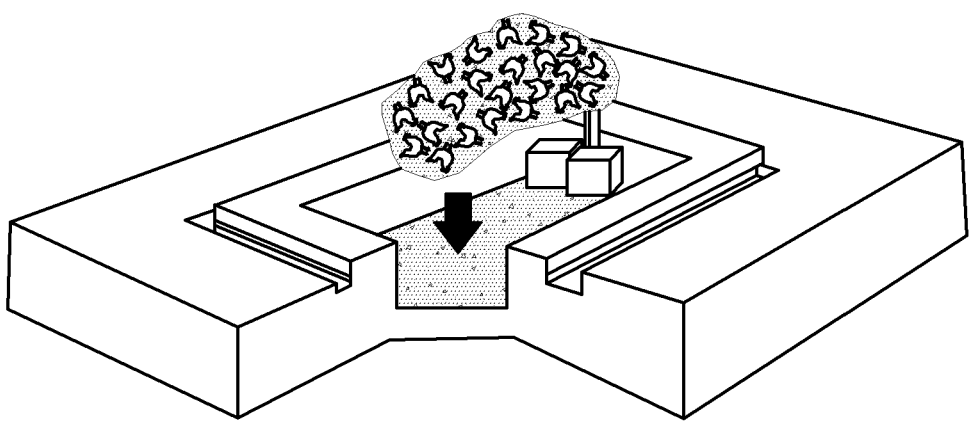
FIG. 6B shows a state in which aerobic microorganisms and livestock carcasses are mixed in the burial facility shown in FIG. 6A.
Figure 7:
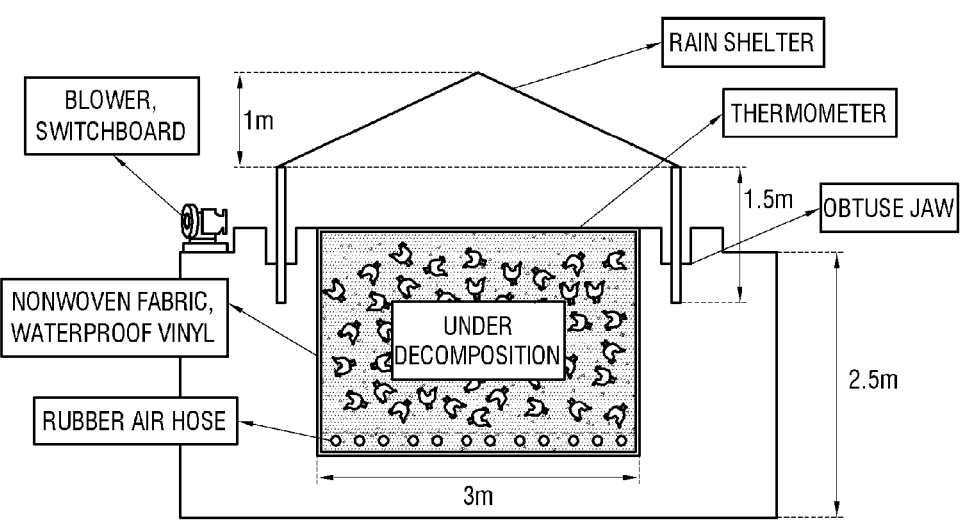
FIG. 7 is a side view showing a state of being buried in the burial facility shown in FIGS. 6A and 6B.

As shown in FIG. 5 to FIG. 7, in the burial fermentation process unit 5, the burial site 6 at the outbreak site of disease is excavated, mixture of livestock carcass and hyperthermophile medium into the burial site 6 is added and then fermented waste is transferred for a certain period of time to base treatment facility, and emptied burial site 6 is covered again with excavated soil and restored to original soil before the onset of the disease for fermentation treatment.

The burial site 6 can be excavated to various depths, but preferably not to exceed 3 m, and excavated at a scale of 300 $m^3$ (3 m*5 m*20 m) per place. In this case, the distance between the burial sites 6 is preferably 6 m or more to facilitate movement of people and equipment.

Then, an impermeable material 8 such as vinyl is placed on the bottom and side of the burial sites 6, and a non-woven fabric or a vinyl cover is additionally covered thereon to prevent damage to the vinyl. However, in the case of using a high-strength waterproof material such as high-density polyethylene (HDPE) other than vinyl, additional covering of the non-woven fabric or vinyl cover may be omitted.

In this case, an environmentally friendly product is recommended for vinyl, and it is used in a size larger than the volume of the burial sites 6. (double vinyl with a thickness of 0.2 mm or more, high strength waterproof material)

In the conventional carcass treatment facility 7, an internal leachate storage tank and a leachate discharge pipe (perforated pipe: opening and closing device at the top) should be installed on the bottom of the burial site 6, but this can be omitted in the burial process of the present invention.

After the installation of the burial site 6 is completed, the carcass is put in at a height of 2 m, and if necessary, the contaminated items (feeds, etc.) from the generated farm are buried together. Then, after putting the carcass in, the carcasses are covered with hyperthermophile medium at a height of 0.5 m or more to the ground. In this case, a separate process of sterilizing with quicklime or the like may be omitted. In addition, there is no need to install a gas discharge pipe and an external storage tank (portable tank) at the bottom of the burial site 6.

In addition, in a conventional facility, a fermentation agent and a deodorant or aerobic, thermophilic microorganisms, etc. are periodically sprayed upon burial of a carcass to remove odors and are additionally sprayed if the odor is severe, but the present invention does not require such a facility due to the improved decomposition ability of the hyperthermophiles.

On the other hand, when the mobile fermentation process or the burial process is primarily completed as described above, the secondary fermentation proceeds in the base treatment unit 7.

Figure 8:
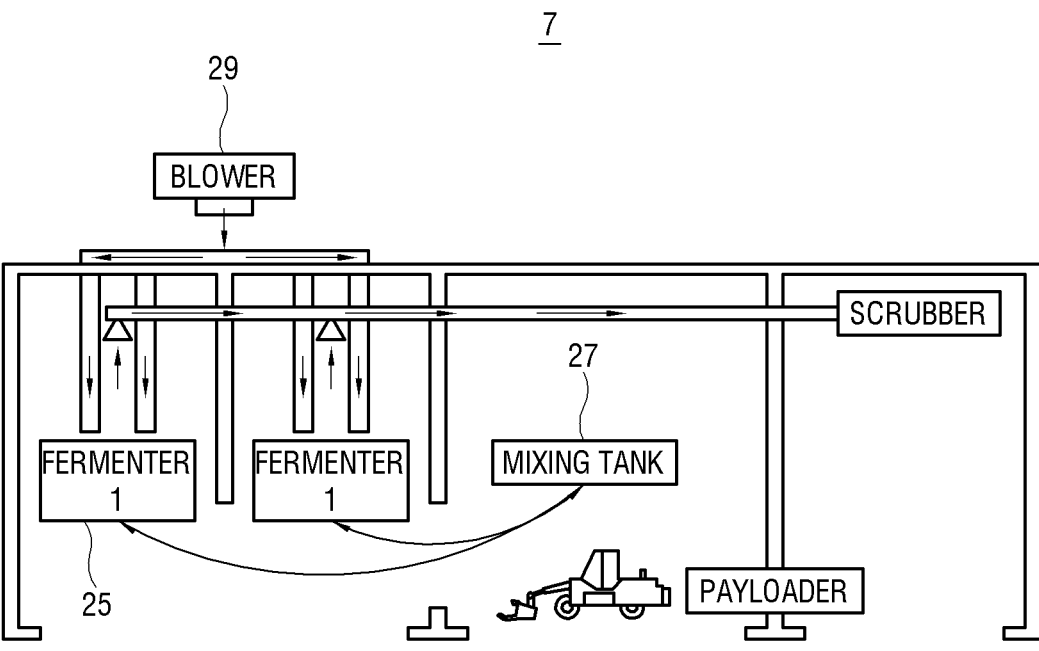
FIG. 8 is a plan view schematically showing the structure of the base treatment unit shown in FIG. 3.
Figure 9:
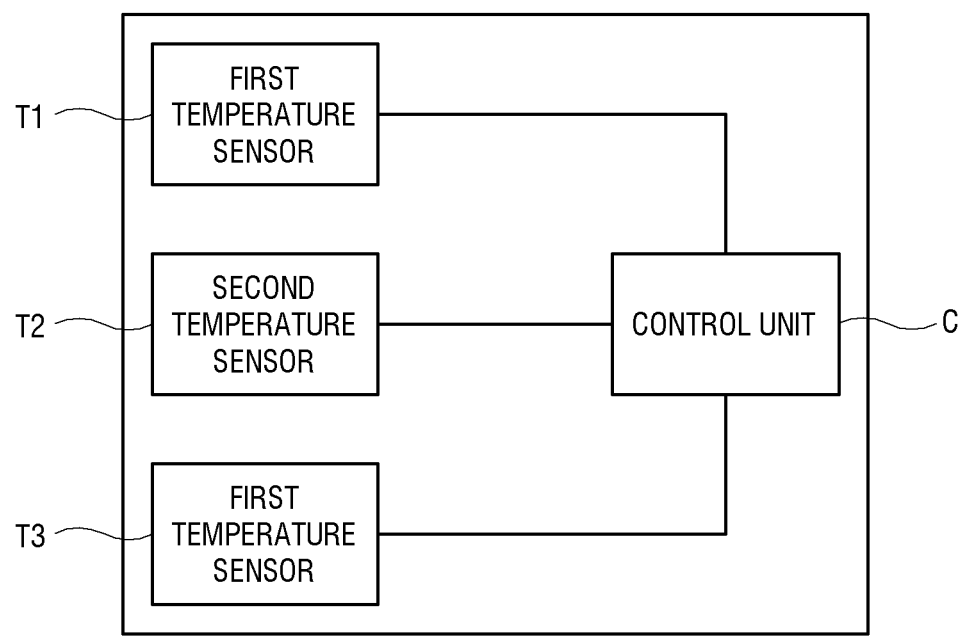
FIG. 9 is a block diagram schematically showing the structure of the control unit of the livestock carcass treatment system shown in FIG. 1.
Figure 10:
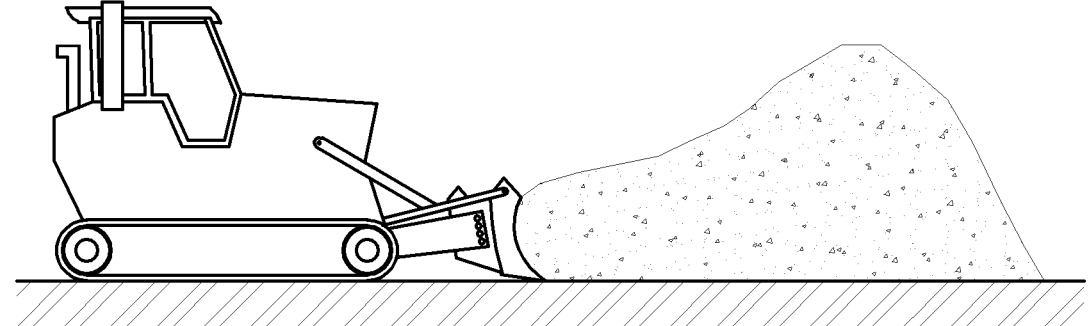
FIG. 10 shows the stirring state of the fermented product in the base treatment unit shown in FIG. 7.
Figure 11:
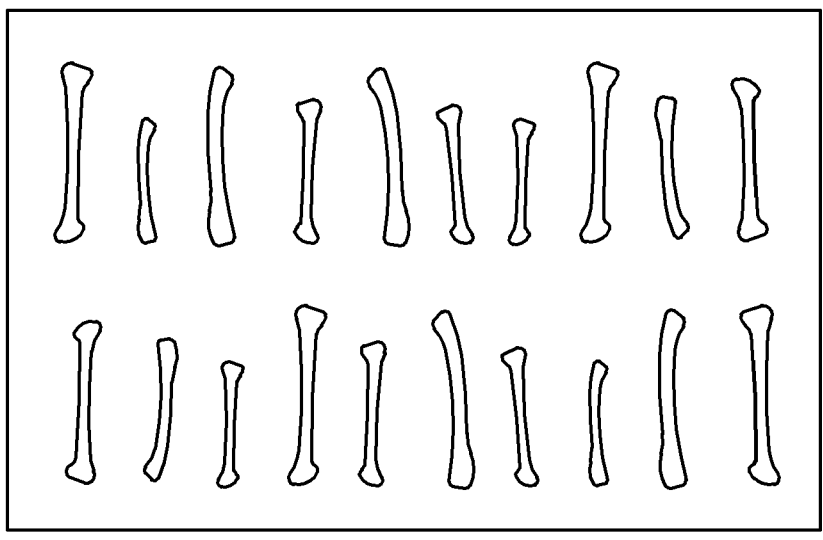
FIG. 11 shows that when 7 days have elapsed after being processed by the carcass treatment system according to the present invention, the tissues except for the bones are completely decomposed.

That is, the base treatment process in the base treatment facility 7 proceeds, and as shown in FIG. 8 to FIG. 10, the base treatment unit 7 is an ultra-reducing system 1 for organic waste by ultra-high temperature fermentation bacteria of 100° C. or higher and has an open front form with a partition type. This method has the advantage of simplifying the flipping process with a minimum of equipment and has a stackable system 1 that can maximize air supply.

This system 1 can efficiently remove moisture evaporated into steam at the maximum fermentation temperature of 110° C. while appropriately controlling the amount of air required for fermentation in the fermentation tank (Adjusting the amount of air injection to approximately 10 to 30 $L/m^2 \cdot min$)

The purpose of the post-processing fermentation facility such as the base treatment unit 7 is to decompose and stabilize undecomposed organic matter in the primary fermentation process, and at the same time to control various odors remaining in the fermented product or livestock carcass.

The base processing unit 7 includes a plurality of fermenters 25; a mixing tank 27 for mixing livestock carcasses fermented in the fermenter 25 and hyperthermophile medium; and a blower 29 for blowing air.

In more detail, in the plurality of fermenters 25, new YM new medium is sufficiently covered in an acid form on the air pipe so that foreign substances and moisture do not block the air hole of the pipe.

Then, it is checked visually and by touch whether the air is well discharged by operating the blower 29.

In this state, fermentation is performed in the fermenter 25, and after a certain period of time has elapsed, it is transferred to the mixing tank 27 with a payloader or the like.

At this time, the properties of the mixtures, for example, moisture content, specific gravity, weight, odor, and salt are confirmed. The mixing amount with the YM medium according to the properties of each mixture is calculated and the mixing amount calculation standard is preferably about 40 to 45% of moisture content.

In this way, the YM medium and organic waste are uniformly mixed by the payloader equipment until they are in an optimal state.

When sufficient mixing is achieved, the wastes mixed in the plurality of fermenters 25 are transferred and piled up.

Before the start of fermentation, the properties of the waste accumulated in the fermenter 25, for example, moisture content, specific gravity, weight, odor, salt, etc. are checked.

In addition, the upper end of the fermenter 25 is divided into thirds in the vertical direction, and three thermometers are installed to a depth of 0.6 to 1 m avoiding the air pipe. And, it is preferable to measure and record the temperature three times daily until the end of the total fermentation period (40 to 45 days).

When the measurement preparation is completed, the blower 29 is operated to supply air to the fermenter 25. Then, as the fermentation progresses, the amount of air supplied is appropriately adjusted, and the fermentation temperature is also checked.

If the temperature of the fermentation waste rises to the maximum and then falls, it means that the stirring timing is imminent. In general, the stirring timing is 7 to 10 days when the temperature drops to the maximum.

Agitation is carried out with the payloader heavy equipment, and when agitating, the waste is sufficiently shaken off with the payloader to blow away moisture.

As such, when a certain period of time has elapsed in the fermenter 25, the organic wastes are transferred to the neighboring fermenter 25 for secondary fermentation. Then, the transferred wastes are repeatedly measured and fermented. At this time, the fermentation is completed through a stirring process a total of 5 to 6 times, and then the fermentation is terminated.

As a direct final fermentation reaction in the base processing unit 7, the period of the primary fermentation process is shortened and rapid stabilization of organic matter occurs at an average reaction temperature of 100° C. or higher, so that reduction of organic waste and fermentation can proceed simultaneously.

On the other hand, the livestock carcass treatment system of the present invention is primarily processed by the mobile fermentation process unit 3 or the burial fermentation process unit 5, and secondarily, the processing step of the carcass in the base treatment unit 7 is On the other hand, in the livestock carcass treatment system of the present invention, the primary carcass treatment step is performed by the mobile fermentation process unit 3 or the burial fermentation process unit 5, and the secondary livestock carcass treatment step is the base treatment unit 7 is performed. This livestock carcass treatment method can be performed in stages according to the temperature value measured by the temperature sensor.

That is, as shown in FIG. 9, in the mobile fermentation process unit 3, the first temperature sensor T1 is mounted inside the main body 12 of the rotary closed fermenter 10 to measure the room temperature, and a second temperature sensor T2 is mounted on the burial site 6 of the burial fermentation process unit 5 to measure the fermentation temperature.

Then, the temperature values measured by the first and second temperature sensors T1 and T2 are transmitted to the central control unit C through the network. The control unit C can determine the degree of progress of the mobile fermentation process unit 3 by sensing the internal temperature of the main body 12 of the rotary closed fermenter 10 by the first temperature sensor T1. In addition, by detecting the temperature of the burial site 6 by the second temperature sensor T2, the progress of the burial fermentation process unit 5 can be checked.

In addition, a temperature value is transmitted to the control unit C from the third temperature sensor T3 disposed in the fermenter 25 of the base treatment unit 7.

Therefore, the control unit C can check the progress state of the mobile fermentation process unit 3 or the burial fermentation process unit 5, which is primarily performed by the first to third temperature sensors T1, T2, T3. Also, it is possible to check the progress state which is secondarily performed by the base treatment unit 7.

And, after checking the progress state in each process, it is possible to properly proceed by instructing whether to proceed with each process.

For example, when the fermentation temperature of the mobile fermentation process unit 3 or the burial fermentation process unit 5, which is the primary process, reaches a temperature range of about 85 to 110° C., the control unit C instructs to move to the base processing unit 7 for performing the secondary step by transmitting a signal to the rotary closed fermenter 10, which is the transfer means 11.

Alternatively, by sending a signal to the operator of the burial site 6, it instructs to move to the second stage, the base treatment unit 7.

As the base treatment process proceeds, the temperature of the fermenter 25 of the base treatment unit 7 is measured by the third temperature sensor T3, and when a predetermined temperature is reached, it is determined whether the fermentation process unit is complete.

In addition, the time required for each process is measured to determine whether to proceed to the next step.

That is, the controller C measures the period for each process by a timer, and compares the period with the temperature value measured by each temperature sensor to determine whether to proceed.

For example, in the first treatment, the fermentation period is treated for 8-15 days by hyperthermophile to decompose the flesh of the carcass, and at this time, it is checked whether the temperature has reached the range of 85 to 110° C. And, when this condition satisfies, the secondary treatment is performed for 2-4 weeks by hyperthermophile.

Figure 12:
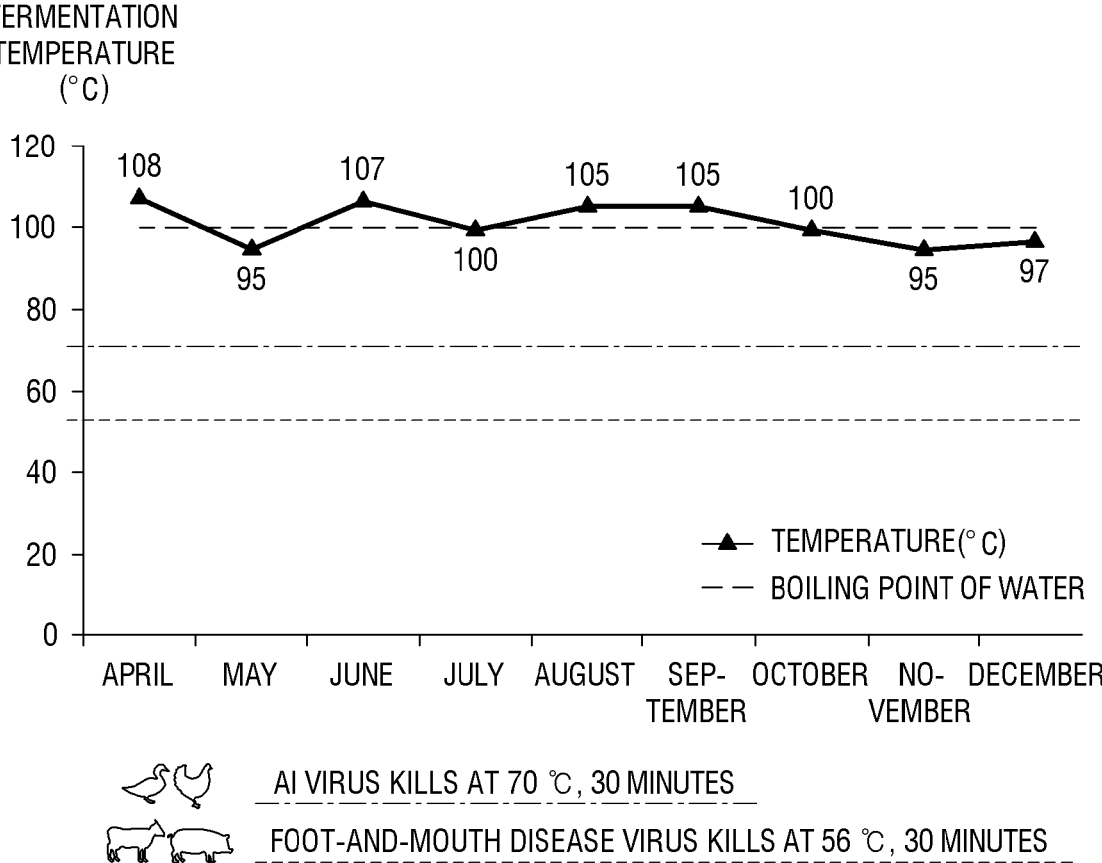
FIG. 12 is a graph showing the fermentation temperature of aerobic hyperthermophile according to the present invention.

On the other hand, after applying the hyperthermophile as described above and firstly treated by the mobile fermentation process unit 3 or the burial fermentation process unit 5, the second treatment is performed by the base treatment unit 7, and then the correlation between the fermentation temperature and season is shown in FIG. 12.

As shown in the drawing, it can be seen that the fermentation temperature is maintained in the range of 95 to 108° C., which is a temperature exceeding 70° C., the death temperature of the AI virus, and 56° C., the death temperature of the foot-and-mouth disease virus.

Therefore, it can be seen that AI virus and foot-and-mouth disease virus can be effectively killed when livestock carcass is treated with the hyperthermophile according to the present invention.

Figure 13:
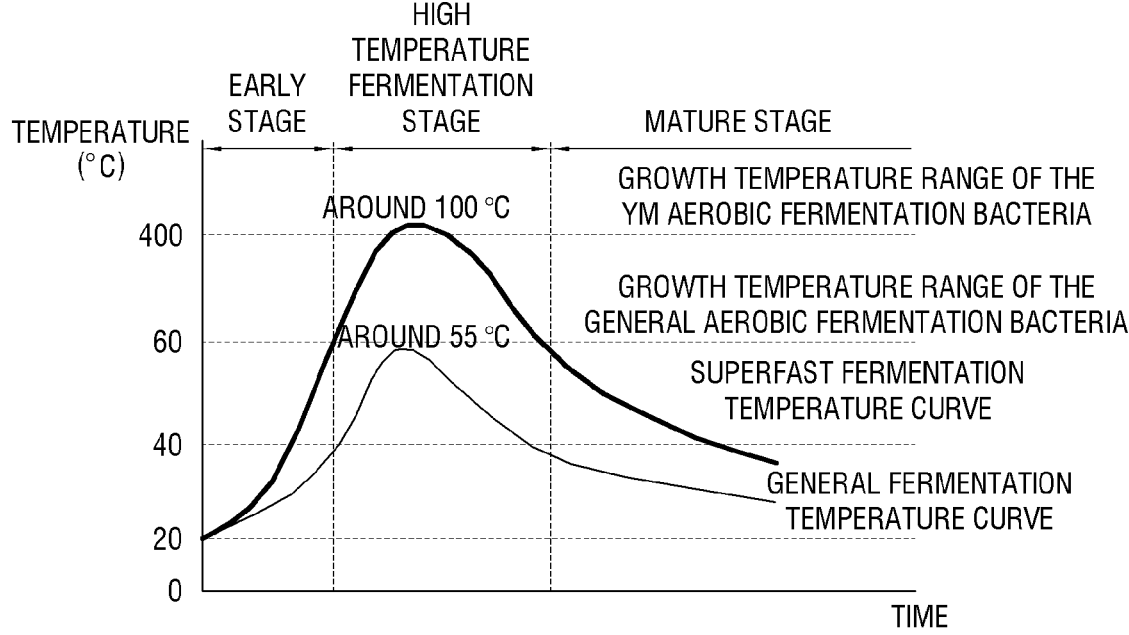
FIG. 13 is a graph comparing the growth temperature of aerobic hyperthermophile of the present invention and general aerobic bacteria.
Figure 14:
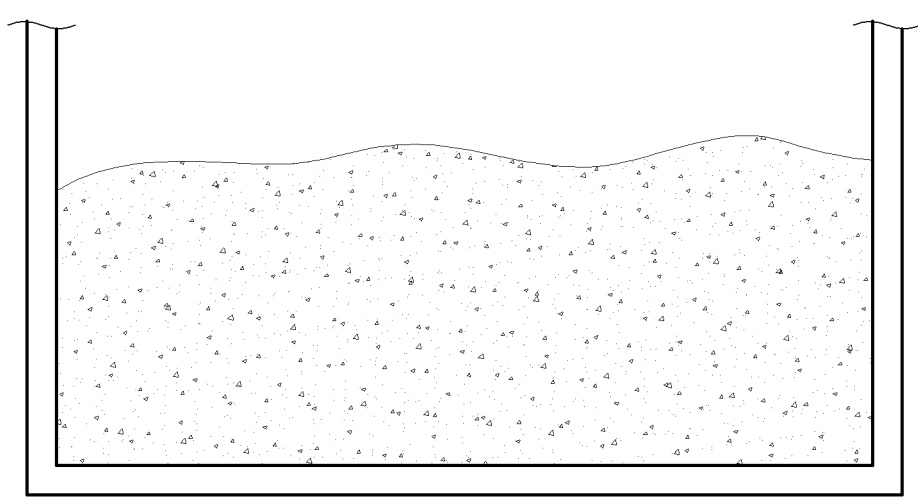
FIG. 14 shows a final fermentation product according to the present invention.

As can be seen from the FIG. 13, it can be seen that the growth temperature range of the YM aerobic fermentation bacteria according to the present invention is 100° C. or higher, while the growth temperature range of the general aerobic fermentation bacteria is around 55° C.

Figure 15:
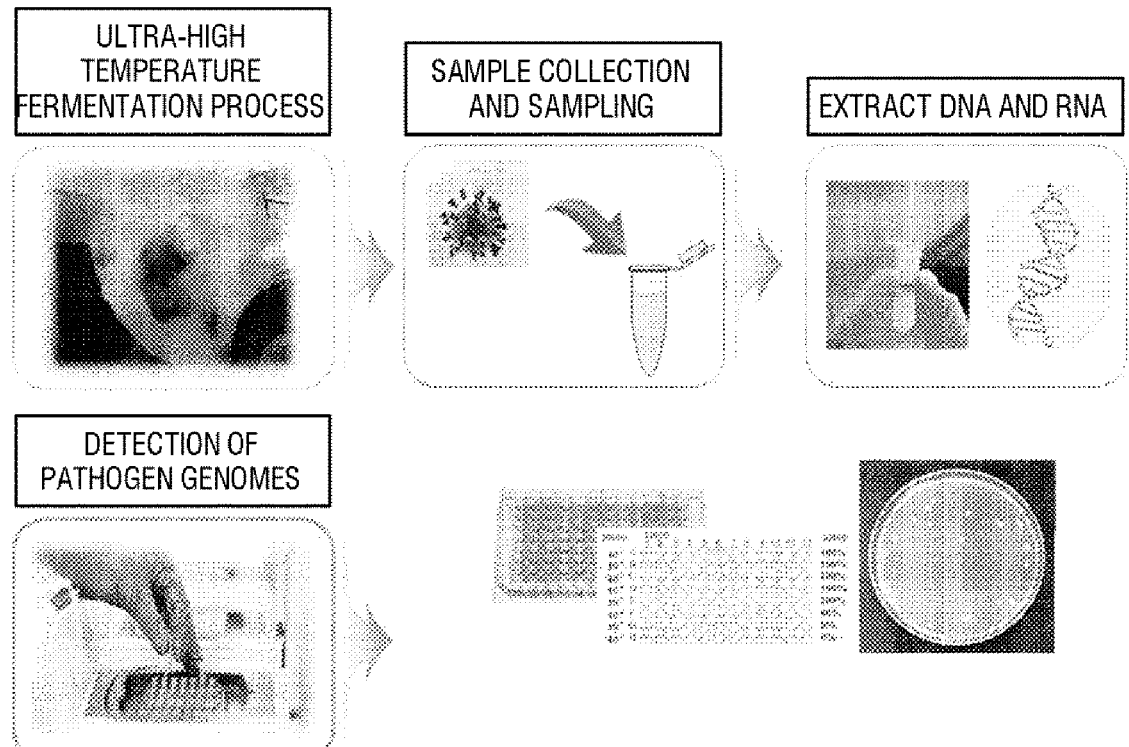
FIG. 15 shows the hyperthermophile treatment test process after inserting pathogens into the livestock carcass.

On the other hand, when the livestock carcass is treated by the hyperthermophile, the effect is not only visually confirmed, but also various pathogens are injected into the livestock carcass as shown in FIG. 15 and the killing result was confirmed.

First, 9 pathogens were inserted into the livestock carcass and infected. The nine pathogens, which are *Salmonella Typhimurium, Escherichia coli, Bacillus subtilis, Clostridium perfringens, Mycobacterium*, Tricophyton *mentagrophytes*, Avian Influenza A, Avian Influenaza A, Coroan virus, and Hepatitis A virus. were used.

And, as described above, hyperthermophiles were applied to livestock carcasses and decomposition treatment was carried out by dividing into primary and secondary treatments, and then PCR analysis (Polymerase Chain Reaction) was performed. First, samples were collected, and DNA and RNA were extracted, and the experiment was conducted in the order of detecting the genome of the pathogen.

As a result, it was confirmed that 9 types of pathogens were killed as shown in the table below.

(1) Fertilizer Analysis (Organic Waste)

The physicochemical properties of materials to be fermented for each sewage sludge and food waste was confirmed by analyzing nitric acid, phosphoric acid, potassium, organic matter, pH, EC, moisture, salinity, heavy metal analysis (As, Cd, Hg, Pb, Cr, Cu, Ni, Zn), hydrochloric acid insolubles, *Escherichia coli*, and *Salmonella.*

(2) Fermentation Status Identification

Temperature change, pH change, $CO_2$, $NH_3$ (g) change, weight, volume loss change, nitric acid, phosphoric acid, potassium, organic matter, pH, EC, moisture, salinity, heavy metal analysis (As, Cd, Hg, Pb, Cr, Cu, Ni, Zn) were measured according to fermentation progress.

(3) Final Fertilizer Analysis

Nitric acid, phosphoric acid, potassium, organic matter, pH, EC, moisture, salinity, heavy metal analysis (As, Cd, Hg, Pb, Cr, Cu, Ni, Zn), hydrochloric acid insoluble matter, *E. coli, salmonella*, fertilization Samples were collected during mixing and stirring of organic matter and YM medium, and a certain amount was

TABLE 2

(Result of evaluation test on the death of pathogens inside livestock carcasses)

| | | PCR Analysis | | | YM medium | CFU test | |
| | | | | | before/after | DuckCFU | Temperature |
| Classification | pathogens | Duck | Pig | Temperature control | reaction | test | control |
|---|---|---|---|---|---|---|---|
| Bacteria | *Salmonella Typhimurium* | + | – | + | – | – | – |
| | *Escherichia coli* | + | – | + | – | – | + |
| | *Bacillus subtilis* | + | – | + | – | – | + |
| | *Clostridium perfringens* | – | – | + | – | NA | – |
| | *Mycobacterium* | – | – | + | – | NA | + |
| Fungai | Tricophyton mentagrophytes | + | – | + | – | – | – |
| Virus | AvianInfluenaza A | – | – | – | – | NA | NA |
| | Coroana virus | – | – | – | – | NA | NA |
| | Hepatitis A virus | – | – | – | – | NA | NA |

That is, as a result of performing the PCR analysis, it can be confirmed that all of the DNA was annihilated as shown in the above table.

In addition, as result of colony-forming unit (CFU) test, it was confirmed that colonies were not formed in the medium.

On the other hand, in general, the odor is a very serious problem in the treatment of carcasses of livestock, but the carcasses treated by the ultra-high temperature fermentation process unit 3 at 100° C. or higher of the present invention are completely fermented with a moisture content of 25 to 35%, so there is no smell and the final fermentation product is mixed with the livestock carcass waste again, and there is an effect of removing the odor that the livestock carcass waste has in the fermentation process unit.

Unlike the existing livestock carcass treatment method, according to the present invention, it has the advantage that it is possible to process by mixing only the ultra-high temperature medium and livestock carcass, and also It can be treated in combination with ultra-high temperature medium and other organic wastes such as sewage sludge and food waste.

Various physical properties of the fermented product produced when the fermentation in the base treatment unit 7 proceeds were analyzed as follows:

taken when moving the fermented product using a payloader. A material that does not corrode or rust during the sampling process or storage was used for the collection tool.

After uniformly mixing the collected sample and taking an appropriate amount necessary for measurement, pulverized samples were stacked in a cone shape on a clean plane using the cone quadrant method, and the top of the cone was pressed vertically to make it flat, and it was divided this into quarters and two parts facing each other were taken and the other half was discarded. This operation was repeated several times to reduce it to an appropriate size and then collect it.

1. Physical and Chemical Measurement (1) Temperature Measurement

A thermometer with a length of 1.5 m, a diameter of 10 mm, and a max of 150° C. was placed in three places at the top, middle, and bottom of the upper part of the mixture. and the thermometer was inserted to a depth of about 1 m. The thermometer was installed at 3 points in the upper part immediately after mixing and stirring, and the temperature was measured 3 times a day at 08:30, 13, and 17 o'clock.

(2) Fermentation Gas Measurement

A gas detector for the detector tube, a portable gas detector (Tube Pump for Gas Detect), is a vacuum type gas collector, which has a highly airtight structure by reducing the pressure inside the cylinder by a piston and sucking the sample gas through the detector tube. The initial suction speed is fast and it gradually becomes slower as time goes by.

This phenomenon is the most excellent way to realize a vivid colored layer. $CO_2$ and ammonia ($NH_3$) were measured 3 times a day at 08:30, 13, and 17 at a certain point in the upper layer of the fermentation stage.

(3) pH Analysis

The glass electrode (Cupric electrode: model 94-29) is left in water for several minutes, and the pH value was corrected by immersing it in a standard solution close to the pH of the sample. The pH meter (Orion:model 701A digital pH/mA meter) was left for at least 5 minutes after power is applied. About 10 g of the sample was added into a 50 mL beaker, 25 mL of distilled water was added and stirred well, left for at least 30 minutes, and the pH of the supernatant of this suspension was measured.

(4) C/N Ratio Analysis

About 1-2 mg of sample was collected in aluminum cap, and $CO_x$, $H_2O$, NOx, $SO_x$ in the gas generated by burning the sample in an oven at 900° C. using an E/A meter (CE Instruments: EA1110, EA1112) was detected by the detector and quantified.

(5) Analysis of Organic Matter in Water and Solid Matter

After drying the evaporation dish at 105~110° C. for 1 hour, it was left in a sulfuric acid desiccator, cooled naturally, and the weight was measured precisely (W1). An appropriate amount of the sample was taken and the weights of the evaporation dish and the sample were measured (W2). The above sample was dried at 105~110° C. for 4 hours. It was cooled naturally in a sulfuric acid desiccator and the weight was measured accurately (W3).

At this time, values of moisture and solid (%) can be obtained.

Then, the crucible was strongly heated at 600±25° C. for 30 minutes in advance and naturally cooled in a sulfuric acid desiccator, and then the weight was precisely measured (W1).

An appropriate amount (20 g or more) of the sample was taken, and the weight of the evaporation dish and the sample was measured (W2). 25% ammonium nitrate solution was added thereto to wet the sample, and then slowly heated to carbonize it. After heating at 600±25° C. for 30 minutes, it was cooled naturally in a sulfuric acid desiccator and the weight was precisely measured (W3).

At this time, the heating loss value (%) can be obtained.

$$\frac{(W2 - W3)}{(W2 - W1)} \times 100$$

Volatile solids (%)=Loss on heating (%)−Moisture (%)    1)

Organic content (%)=Volatile solids (%)/Solids (%)× 100    2)

The solid value and the result value of Equation 1) were entered into Equation 2) and calculated.

(6) Measurement of Volume and Weight Change

A volume point was determined in the fermenter 25, the height of the fermented product was measured, and the volume was measured by a separate calculation formula. A 55 L cylinder was filled with water and the weight of the cylinder and water was measured. During mixing and stirring, a certain amount of the sample was collected, placed in a cylinder, weighed, and the result divided by the weight of the cylinder and water was used as the specific gravity, and the volume was multiplied by the specific gravity to obtain the weight.

(7) Heavy Metal Analysis

Inductively Coupled Plasma—Atomic Emission Spectrometer (ICP) is an analysis method used for qualitative and quantitative analysis of elements, in which after introducing a sample under the argon plasma flame formed by the high-frequency induction coil and excitation of the target atom to be analyzed by atomization, the emission line and emission intensity emitted when the excited atom falls to the ground state at 6000~8000° C. are measured.

The finished fermentation product was pulverized using a ball mill to prepare a sample in powder form. About 0.5 g of the powder sample was weighed and placed in a Teflon Vessel for Microwave. $HNO_3$ 9 mL and HCl 3 mL were added, and $H_2O_2$ 1 mL was added. The sample was set up and the sample was pretreated according to the conditions of the device. The sample was taken out and placed in a refrigerator at −5° C. and cooled for 2-3 hours.

This sample was naturally cooled to room temperature, put into a 50 mL volumetric flask, and immediately analyzed. 1 L of 3% $HNO_3$ solution was prepared. A standard sample was prepared by diluting the standard sample to an arbitrary concentration using a pipette and volumetric flask after calibration was completed. After checking the blank value, the standard sample was measured three times, and a calibration curve was prepared with the average value.

The test equipment of the present invention is ICP AES (ULTIMA II, Jovin Yvon, France), which is a forced introduction method by a Peristaltic Pump. A photomultiplier tube (PMT) detector was used as a sequential measurement method using a diffraction grating device with a vertical torch shape. As the gas, argon was used.

(8) Chloride Determination

When chlorides other than sodium salts exist, separately, sodium (Na) is quantified by the frame photometric method, multiplied by 2.542, and compared with the value calculated from the preceding chlorine amount, the smaller value is used as the amount of salinity (NaCl).

A sample (about 2.5 g) was taken in a platinum crucible, mixed and dried with lime milk, and then heated vigorously until the organic matter was carbonized. This was transferred to a 500 ml volumetric flask, shaken with water, filled with water up to the mark, and filtered through a dry filter paper.

(9) Measurement of *E. coli* and *Salmonella*

For the test method for *E. coli*, the Most Prabable Number method suggested in the Water Pollution Process Test Method (Ministry of Environment Notice No. 2004-188) was used. After mixing 1 g of each sample in a test tube containing 100 ml of sterile phosphate buffer solution, 10 ml, 1 ml and 0.1 ml were each inoculated into 5 lauryl tryptose ion medium fermentation tubes and incubated for 24±2 hours in an incubator at 35° C. At this time, the fermentation tube in which gas generation was observed was judged to be positive for total *E. coli* group. From this positive tube, the number of *E. coli* in 1 g of the sample was calculated according to the Most Prabable Number method of the Water Pollution Process Test Method.

For the *Salmonella* measurement method, 10 ml, 1 ml, and 0.1 ml of the sample diluted in the same manner as the *E. coli* number measurement method were inoculated to 20 ml of 3-fold concentrated selenite medium (Difco™ Selenite Broth: pancreatic digest of casein 5.0 g/l, lactose 4.0 g/l, sodium selenite 4.0 g/l, sodium phosphate 10.0 g/l), respectively. The inoculated test tube was incubated for 18 to 24 hours in an incubator at 37° C.

After taking the culture solution of all the cultured enrichment medium, streaking (plate smear) it on a bismuth agar selective medium (Difco™ Bismuth Sulfate Agar: beef extract 5.0 g/l, peptone 10.0 g/l, dextrose 5.0 g/l, disodium phosphate 4.0 g/l, ferrous sulfate 0.3 g/l) I, bismuth sulfite indicator 8.0 g/l, brilliant green 0.025 g/l, agar 20.0 g/l), and culturing for 24 to 48 hours in an incubator at 35° C., black and shiny colonies with a white border were estimated to be *Salmonella* positive. The number of media identified as *Salmonella* positive was counted and the number of *Salmonella* was measured using the Most Prabable Number method presented in the Water Pollution Process Test Method.

(10) Mixing and Stirring

The process of mixing raw material organic waste with YM medium using a payloader is called mixing, and as the fermentation progresses after this process, a time point at which the fermentation temperature rises and then falls is regarded as one stage of aerobic fermentation, and the process of moving and mixing from the fermenter 25 to the empty fermenter 25 using a payloader is called agitation.

Mixing was performed by accumulating the mixture in the fermenter 25 by calculating the moisture content of the raw organic waste itself and the moisture content of the YM medium with reference to 35 to 45% at an appropriate mixing ratio. Agitation repeats the process of transferring from the fermenting tank 25 to the empty fermenter 25 at a point in time when the maximum temperature of one stage of fermentation falls, about 6 to 7 times until the end of the fermentation.

Through the above experimental process, the quality inspection results of the final by-products of livestock carcass treatment are suitable as shown in the table below.

TABLE 3

| Inspection items | Standard | YM + sewage sludge + livestock carcass | YM + food + carcass |
|---|---|---|---|
| Nitrogen (%) | — | 2.91 | 2.93 |
| Phosphoric acid (%) | — | 5.24 | 4.96 |
| Potassium (%) | — | 0.62 | 0.82 |
| Organic matter (%) | 30 and more | 37.8 | 44.8 |
| C/N | 45 and less | 13.0 | 15.3 |
| Arsenic (mg/kg) | 45 and less | 3.46 | 2.89 |
| Cadmium (mg/kg) | 5 and less | — | — |
| Mercury (mg/kg) | 2 and less | — | — |
| Lead (mg/kg) | 130 and less | 8.60 | 5.72 |
| Chromium (mg/kg) | 200 and less | 39.3 | 23.9 |
| Copper (mg/kg) | 360 and less | 277.4 | 177.3 |
| Nickel (mg/kg) | 45 and less | 25.6 | 23.0 |
| Zinc (mg/kg) | 900 and less | 678.2 | 532.4 |
| Salts (%) | 2.0 and less | 0.60 | 0.69 |
| pH (1:10) | — | 7.95 | 8.26 |
| Electrical conductivity | — | 5.79 | 5.02 |
| Moisture (%) | 55 and less | 30.0 | 24.9 |
| Hydrochloric acid insoluble | 25 and less | 8.99 | 7.96 |
| Immaturity | 70 and more | 104.0 | 116.4 |
| *E. coli* | not detected | not detected | not detected |
| *Salmonella* | not detected | not detected | not detected |

INDUSTRIAL APPLICABILITY

The present invention relates to a livestock carcass treatment system using hyperthermophile, and more particularly, to technology that firstly, can rapidly process a carcass at the site of an outbreak and quickly restore the site to its original state and secondly, increase the processing efficiency of the carcass by fermenting it at the base treatment unit, by selectively applying a rotatory closed mobile fermentation process unit or an ultra-high temperature aerobic burial fermentation process unit during fermenting carcasses by hyperthermophile (YM bacteria), and it is applicable to the field of animal carcass treatment technology.

The invention claimed is:

1. A livestock carcass treatment system for fermenting and decomposing livestock carcass by hyperthermophile under aerobic conditions, the livestock carcass treatment system comprising:

a first livestock carcass treatment structure comprising a first hyperthermophile and configured to perform an initial treatment of the livestock carcass using the first hyperthermophile at or near an outbreak site of disease, the first livestock carcass treatment structure being either a mobile fermenter configured to be transferred to the outbreak site of disease or an excavated burial site near the outbreak site of disease;

a second livestock carcass treatment structure comprising a second hyperthermophile and configured to perform a secondary treatment of the initially treated livestock carcass using the second hyperthermophile; and at least one controller communicatively coupled to the first livestock carcass treatment structure and the second livestock carcass treatment structure, the at least one controller being configured to:

monitor and control one or more conditions of the initial treatment of the livestock carcass to determine whether flesh of the livestock carcass is decomposed and to signal whether to proceed with the secondary treatment of the livestock carcass, the initial treatment being performed at a fermentation temperature in a range of about 85° C. to about 110° C. for a duration in a range of about 8 days to about 15 days; and monitor and control one or more conditions of the secondary treatment to determine whether bones of the livestock carcass are decomposed, the secondary treatment being performed for a duration in a range of about 2 weeks to about 4 weeks, wherein the second livestock carcass treatment structure further comprises a plurality of fermenters, a mixing tank configured to mix content received from one or more fermenters among the plurality of fermenters, a loader configured to transfer the content between the one or more fermenters and the mixing tank, and a blower configured to blow air into the plurality of fermenters, the controller is further configured to monitor the one or more conditions of the secondary treatment to cause, at least in part, the content to be repeatedly transferred amongst the one or more fermenters and the mixing tank, and the first and second hyperthermophiles to Caldothrix *Satsumae*.

2. The livestock carcass treatment system of claim 1, wherein the first livestock carcass treatment structure is the mobile fermenter, the mobile fermenter comprises a movable base, and a rotary closed fermenter mounted on the moveable base, and the rotary closed fermenter comprises:

a main body including a space therein, a motor assembly on one side of the main body and configured to generate a rotational force;

a mixer horizontally disposed inside the main body and configured to mix the livestock carcass and the first hyperthermophile during rotation;

an inlet provided on a first side of the main body and configured to receive the livestock carcass and the first hyperthermophile therein; and an outlet provided on a second side of the main body opposite the first side of the main body and configured to discharge fermented livestock carcass in the form of fermented products.

3. The livestock carcass treatment system of claim 2, further comprising:

a first temperature sensor mounted inside the main body and configured to measure the fermentation temperature; and a second temperature sensor disposed in at least the fermenter among the plurality of fermenters of the second livestock carcass treatment structure, the second temperature sensor being configured to measure fermentation temperature in the at least one fermenter;

wherein the at least one controller is further configured to determine whether to proceed to the secondary treatment based on information received from the first temperature sensor and timing information, and to determine whether to transfer the content from the one or more fermenters to the mixing tank based on information received from the second temperature sensor and timing information.

4. The livestock carcass treatment system of claim 1, wherein the first livestock carcass treatment structure is the excavated burial site, and the excavated burial site comprises a hole lined with an impermeable material upon which the livestock carcass and the first hyperthermophile are disposed.

5. The livestock carcass treatment system of claim 4, further comprising:

a first temperature sensor disposed in the hole and configured to measure fermentation temperature in the hole; and a second temperature sensor disposed in at least one fermenter among the plurality of fermenters of the second livestock carcass treatment structure, the second temperature sensor being configured to measure fermentation temperature in the at least one fermenter, wherein the at least one controller is further configured to determine whether to proceed to the secondary treatment based on information received from the first temperature sensor and timing information, and to determine whether to transfer the content from the one or more fermenters to the mixing tank based on information received from the second temperature sensor and timing information.

6. The livestock carcass treatment system of claim 4, wherein the impermeable material comprises high-density polyethylene.

7. The livestock carcass treatment system of claim 4, wherein the excavated burial site further comprises a cover material disposed between the impermeable material lining the hole and a combination of the livestock carcass and the first hyperthermophile.

8. The livestock carcass treatment system of claim 7, wherein the impermeable material comprises vinyl, and the cover material comprises a non-woven fabric.

9. The livestock carcass treatment system of claim 1, wherein the Caldothrix *Satsumae* is a Caldothrix *Satsumae* YM081 (FERM BP-8233).

10. The livestock carcass treatment system of claim 1, wherein the fermentation temperature of the initial treatment is maintained in the range by metabolic heat generated by the first hyperthermophile without external heat input.

11. The livestock carcass treatment system of claim 1, wherein the loader is a payloader.

12. The livestock carcass treatment system of claim 1, wherein the controller is configured to monitor and control the one or more conditions of the secondary treatment to maintain a moisture content of the content in a range of about 40% to about 45%.

* * * * *